United States Patent
Hsieh

(10) Patent No.: US 6,683,948 B1
(45) Date of Patent: Jan. 27, 2004

(54) DEVICE FOR AUTOMATICALLY IDENTIFYING DTMF AND FSK FOR CALLER ID

(75) Inventor: Meng-Tsung Hsieh, Hsinchu (TW)

(73) Assignee: Sunplus Technology Co., Ltd. (TW)

( * ) Notice: Subject to any disclaimer, the term of this patent is extended or adjusted under 35 U.S.C. 154(b) by 686 days.

(21) Appl. No.: 09/634,915

(22) Filed: Aug. 9, 2000

(51) Int. Cl.$^7$ .................. H04M 1/00; H04M 3/00; H04M 1/56
(52) U.S. Cl. ............ 379/372; 379/142.13; 379/142.18; 379/283; 379/373.01
(58) Field of Search ............. 379/88.19, 88.21, 379/93.18, 93.23, 142.01, 142.04, 142.13, 142.18, 283, 360, 373.01, 372, 442

(56) References Cited

U.S. PATENT DOCUMENTS 6,195,421 B1 * 2/2001 Chen ............... 379/142.01

* cited by examiner

Primary Examiner—Binh Tieu
(74) Attorney, Agent, or Firm—Lowe Hauptman Gilman & Berner, LLP

(57) ABSTRACT

A device for automatically identifying DTMF and FSK system is disclosed. A signal detector is provided for detecting signals on a telephone line. A DTMF and a FSK decoders are provided for decoding DTMF and FSK signals, respectively. A microprocessor is activated when the signal detector detects a signal on the telephone line for only activating the DTMF decoder to calculate frequency spectrum of the detected signal. When the calculated frequency spectrum conforms to DTMF frequency spectrum, it is determined that a DTMF system is in use. When the calculated frequency spectrum only has a frequency of about 1,200 Hz or 1,300 Hz, it is determined that a FSK system is in use, so as to deactivate the DTMF decoder and activate the FSK decoder.

9 Claims, 2 Drawing Sheets

| COLUMN FREQ<br>ROW FREQ | 1209Hz | 1336Hz | 1477Hz | 1633Hz |
|---|---|---|---|---|
| 697Hz | 1 | 2 | 3 | A |
| 770Hz | 4 | 5 | 6 | B |
| 852Hz | 7 | 8 | 9 | C |
| 941Hz | * | 0 | # | D |
| 1300Hz | | | | |

| CHANNEL SEIZURE SIGNAL | MARK SIGNAL | MESSAGE TYPE | MESSAGE LENGTH | MESSAGE | CHECKSUM |
|---|---|---|---|---|---|

DEVICE FOR AUTOMATICALLY IDENTIFYING DTMF AND FSK FOR CALLER ID

BACKGROUND OF THE INVENTION

1. Field of the Invention

The present invention relates to the field of caller identification (caller ID) and, more particularly, to a device for automatically identifying DTMF and FSK system by activating only a single decoder.

2. Description of Related Art

The service of caller ID has become popular recently. In general, caller ID service refers to that the caller's identification, such as caller's telephone number or name, is shown on the screen of caller ID device connected to the telephone. Conventionally, there are two techniques that are implemented for providing the caller ID service. One is FSK (Frequency Shift Keying) specified by Bellcore (Bell Communication Research), which is available in North America. The other one is DTMF (Dual Tone Multi-Frequency) which is generally available in Europe.

In the DTMF system, the transmitting caller number data is the same as the telephone number of a typical keypad telephone. That is, a digit or character of caller's data is represented by synthesizing a column frequency and a row frequency, in which the row frequency is one of 697 Hz, 770 Hz, 852 Hz, and 941 Hz and the column frequency is one of 1,209 Hz, 1,336 Hz, 1,447 Hz, and 1,633 Hz.

In the FSK system, '0's and '1's of a bit stream are transmitted in different frequencies. For example, in the Bell 202 specification, '0' is a 2,200 Hz signal for 1/1,200 second, and '1' is a 1/1,200 Hz signal for 1/1,200 second. In V.23 specification, '0' is a 2,100 Hz signal for 1/1,200 second, and '1' is a 1,300 Hz signal for 1/1,200 second. A typical caller ID signal format is illustrated in FIG. 4. As shown, the caller ID signal format comprises a channel seizure signal field, a mark signal field, a message type field, a message length field, a representation layer message field, and a checksum field, based on the time of signal received. The channel seizure signal consists of 300 logical '0's and '1's continuously and alternately arranged. The mark signal is of continuous logical '1's that consists of 180±25 or 80±25 bytes, and is equivalent to 130~70 ms or 47~87 ms in terms of time. Therefore, in such a 47~170 ms time period, there is only a sinusoidal signal having a frequency of 1,200 Hz or 1,300 Hz transmitted in the FSK system. Once a logical '0' is present, it indicates that a message type character is being transmitted. In addition, the message type, message length, representation layer message, and checksum fields are provided for indicating the format, length and content of the caller's data, respectively. The checksum is provided to check the correctness of the caller's data.

In various countries, caller ID service is provided by various FSK and DTMF systems. As such, the caller ID device commercially available on the market must satisfy the requirements of both systems, i.e., the caller ID device must be able to determine whether the caller ID signal is of FSK or DTMF format and receive the same.

Such a caller ID device is typically equipped with a FSK decoder and a DTMF decoder. When a caller ID signal is present, both FSK and DTMF decoders are simultaneously turned on for detecting the FSK signal and DTMF signal, respectively. If at least one valid DTMF signal is present for a sufficient period of time, the FSK decoder is turned off. Thereafter, only DTMF signals are received. On the contrary, the two decoders are kept on, and, when receiving logical '0's and '1's that are continuously and alternately arranged, the DTMF decoder is turned off. Thereafter, only FSK decoder is on for receiving FSK signals until a correct checksum is received.

However, one of the major disadvantage of the above caller ID device is such that both FSK and DTMF decoders have to be turned on at the same time. Therefore, the hardware requirement is twice as that of a single decoder. Moreover, the power required is also doubled.

Another conventional caller ID device is provided with a high speed central processing unit (CPU) or digital signal processor (DSP). The FSK and DTMF decoders are thus implemented in software and executed concurrently to detect the caller ID signal. As such, because the CPU executes two sets of software at the same time, the CPU execution time is twice as that in executing a single set of software. In addition, the memory space required is also doubled because memory can not be shared by the two sets of software.

A further conventional caller ID device utilizes a prompt signal to determine whether the caller ID system is of FSK or DTMF. For example, when sending caller ID signal, FSK system typically transmits a long ringing tone in the beginning, and then transmits a FSK caller ID signal between the first and second ringing signals. Alternatively, the DTMF system typically transmits a short polarity inverse signal in the beginning, and subsequently transmits the DTMF caller ID signal. Thereafter, the ring signals are transmitted. Therefore, it is possible to determine to turn on the FSK decoder or DTMF decoder based on the prompt signal. However, in actual application, the relation between the prompt signal and the signaling of the caller ID system may not be so permanent. For example, it is not necessary for the FSK system to send a ringing tone first. The FSK system may use a reverse polarity signal as a prompt signal, even does not have any prompt signal. Therefore, it is not satisfactory to determine the type of caller ID system by the prompt signal.

SUMMARY OF THE INVENTION

It is therefore an object of the present invention to provide a device for automatically identifying DTMF and FSK system, which is able to automatically determine the type of the caller ID system by only activating a single decoder.

To achieve the above object, the device of the present invention is provided with a signal detector, a DTMF decoder, a FSK decoder and a microprocessor. The signal detector is provided for detecting signals on a telephone line. The microprocessor is activated when the signal detector detects a signal on the telephone line for only activating the DTMF decoder to calculate frequency spectrum of the detected signal. When the calculated frequency spectrum conforms to DTMF frequency spectrum, it is determined that a DTMF system is in use. When the calculated frequency spectrum only has a frequency of about 1,200 Hz or 1,300 Hz, it is determined that a FSK system is in use, so as to deactivate the DTMF decoder and activate the FSK decoder.

The above and other objects, features and advantages of the present invention will become apparent from the following detailed description taken with the accompanying drawings.

DETAILED DESCRIPTION OF THE PREFERRED EMBODIMENTS

Figures 1, 2:
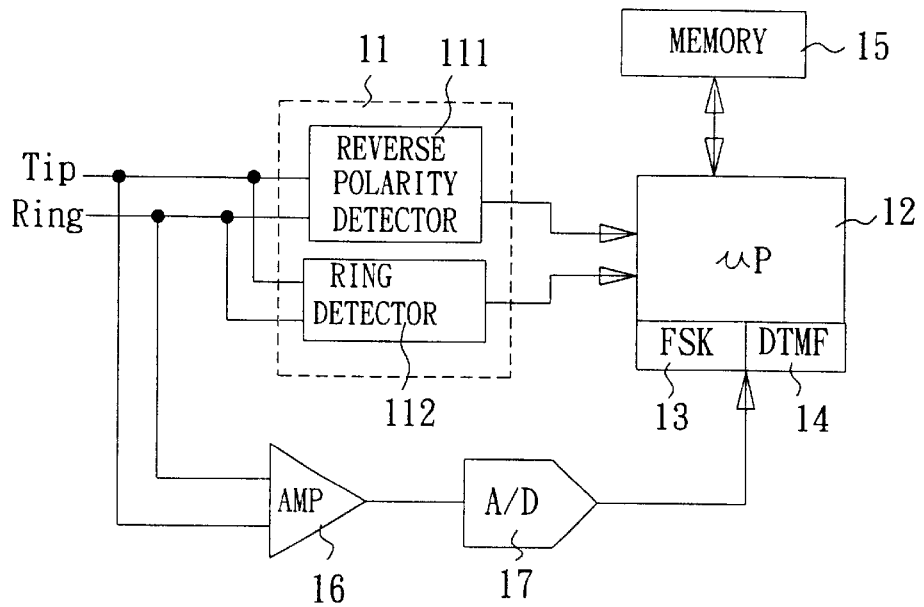
FIG. 1 is a block diagram of a first preferred embodiment of a device for automatically identifying DTMF and FSK system in accordance with the present invention.
FIG. 2 illustrates the column and row frequencies to be calculated by the microprocessor when decoding DTMF signal.

Referring to FIG. 1, there is shown a device for automatically identifying DTMF and FSK system in accordance with a preferred embodiment of the present invention, which includes a signal detector 11, a microprocessor 12, a FSK decoder 13, a DTMF decoder 14, a pre-amplifier 16, an analog to digital converter (ADC) 17, and a memory 15. The signal detector 11 has a reverse polarity detector 111 and ringing detector 112 for detecting a signal on the telephone line, and when detecting of such, the reverse polarity detector 111 will drive the microprocessor 12 to check the signal. The pre-amplifier 16 and ADC 17 are provided to convert the signal on the telephone into digital data for being applied to the microprocessor 12. The FSK and DTMF decoders 13 and 14 may be implemented in firmware or software that is executed by the microprocessor 12.

When the microprocessor 12 is driven, it first activates the DTMF decoder 14 only for decoding a possible DTMF signal. Referring to FIG. 2, when the microprocessor 12 performs the decoding process, the row frequencies to be calculated are those of 697 Hz, 770 Hz, 852 Hz, 941 Hz, and 1,300 Hz, and the column frequencies are those of 1,209 Hz, 1,336 Hz, 1,447 Hz, and 1,633 Hz. Therefore, when a DTMF caller ID signal is actually present, the microprocessor 12 is able to detect this DTMF signal by calculating four row frequencies including 697 Hz, 770 Hz, 852 Hz, and 941 Hz, and all column frequencies, without activating the FSK decoder 13.

If the caller ID signal is of FSK format, as described above, there is a mark signal with a duration of about 47 ms to 170 ms present before the actual caller ID signal. During this 47~170 ms time period, FSK system simply transmits a sinusoidal signal with a frequency of 1,200 Hz or 1,300 Hz. As such, if only the frequency of 1,200 Hz or 1,300 Hz is present in a continuous 47 ms (or even less) time duration, it can be assured that the mark signal of FSK system is received, and can be further determined that the received caller ID signal is of FSK system. At this moment, the DTMF decoder 14 is deactivated and the FSK decoder 13 is activated. Furthermore, memory 15 and other resources that are used by the DTMF decoder 14 are released and completely transferred to the FSK decoder 13.

From the specifications of the DTMF and FSK systems, it is found that the 1200 Hz frequency defined in the Bell 202 specification and the first column frequency, i.e., 1,209 Hz, of DTMF system are very close (differs by only 0.7%). Therefore, it is applicable to slightly lower down the frequency of 1,209 Hz to 1,200~1,209 Hz, or even directly use the 1,209 Hz frequency spectrum without lowering down frequency, to represent the 1,200 Hz frequency spectrum. As such, it is possible to determine whether a mark signal of FSK system is received by calculating the existed DTMF frequencies and an additional 1,300 Hz frequency spectrum. Therefore, by only activating the DTMF decoder 14, a caller ID device is able to receive the DTMF signal and automatically determine whether caller ID system is of FSK or DTMF.

Furthermore, once at least one DTMF character is received, it can be assured that the caller ID system is of DTMF. Thus, it is not necessary to either calculate the 1,300 Hz frequency spectrum or analyze Bell 202 and V.23. The only requirement is to calculate the frequency spectrum associated with DTMF system.

If a sinusoidal wave of either 1,200 Hz or 1,300 Hz is detected to last for a sufficient time before receiving any valid DTMF character, the microprocessor 12 can determine that the caller ID signal is of FSK system. Accordingly, the microprocessor 12 deactivates the DTMF decoder 14 and activates the FSK decoder 13. Also, the memory 15 used by the DTMF decoder 14 is released and completely transferred to the FSK decoder 13 for use. Therefore, the memory 15 is shared by the FSK decoder 13 and DTMF decoder 14, and the required resources are reduced significantly. Furthermore, the microprocessor 12 only executes one decoder so that the speed of the microprocessor 12 is high, generally doubled in comparison with that of a microprocessor executing two decoders. Also, the two decoders will not contend with each other to use the memory 15 so that the required memory space is reduced by half.

In operating of the caller ID device, the microprocessor 12 continuously receives DTMF or FSK signal form a telephone line for being converted to digital data and stored in the memory 15. Once receiving a frame of data, an algorithm, as detailed later, is executed. If the same result is obtained in, preferably, continuously two (or one, or more than two) executions, the microprocessor 12 is able to determine that the decoded signal is of DTMF or FSK system. Once at least one DTMF character is decoded, there is no need to detect the mark signal of FSK system. The algorithm is as follows:

```
/* automatically identify DTMF and FSK system */
DTMF decoder is activated but the FSK or DTMF system is not
determined
Forever /* continuously receive data */
{
if (FSK system is detected out)
   execute FSK decoder
else
   if(a frame of data is received)
      {
      if(DTMF system is determined)
         activate DTMF decoder
         else
         {
         Calculate required frequency spectrum of DTMF and frequency
         spectrum of 1,300 Hz
if (a row frequency spectrum and a column frequency spectrum
   comply with DTMF rule)
   calculate the corresponding DTMF character
   if (the DTMF character is the same as the one decoded by a
      previous frame or more than one continuous frames)
      this DTMF character is determined to be valid and a DTMF
      system is detected out
      else
         temporarily store this character and for comparison in a next
         frame
else if (the frequency spectrum of 1,200 Hz is much stronger than
   other frequency spectrums)
   if (the previous frame or more than one continuous frames are the
      same)
      Bell 202 FSK system is detected out, and DTMF decoder is
      deactivated
   else
      record that a frame of 1,200 Hz is received and perform a
      comparison for a next frame
else if (the frequency spectrum of 1,300 Hz is much stronger than
   other frequency spectrums)
```

```
            -continued if (the previous frame or more than one continuous frames are the
    same)
        V.23 FSK system is detected out, and DTMF decoder is
        deactivated
    else
        record that a frame of 1,300 Hz is received and perform a
        comparison for a next frame
        }
    endif
    }
    endif
endif
} /* forever loop */
```

Figures 3, 4:
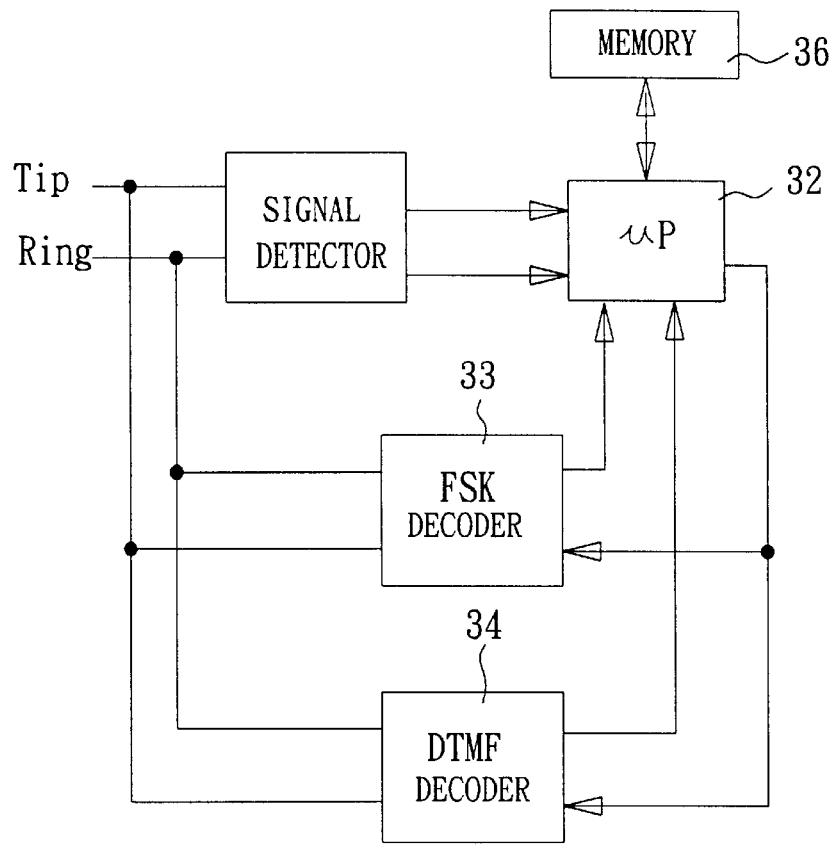
FIG. 3 is a block diagram of a second preferred embodiment of a device for automatically identifying DTMF and FSK system in accordance with the present invention.
FIG. 4 shows the format of a caller ID signal in a FSK system.

Referring to FIG. 3, there is shown another preferred embodiment of the device for automatically identifying DTMF and FSK system in accordance with the present invention, which is the same as the first embodiment except that the FSK decoder 33 and DTMF decoder 34 are implemented in hardware decoding circuit. With such a circuit design, the microprocessor 32 only drives one decoder at one instant. Therefore, the power consumption is half of that in a caller ID device which drives two decoders at the same time. Moreover, the two decoders will not contend with each other to use the memory 36 so that the required memory space is also reduced by half.

In view of the foregoing, it is appreciated that the present invention is able to automatically identify the DTMF and FSK system without using the unreliable prompt signal or activating two decoders at the same time. Therefore, the hardware cost and power consumption can be significantly reduced, and the identification can be achieved accurately. The benefits of this invention includes:

While the invention herein disclosed has been described by means of specific embodiments, numerous modifications and variations could be made thereto by those skilled in the art without departing from the scope and spirit of the invention set forth in the claims.

What is claimed is:

1. A device for automatically identifying DTMF and FSK system, comprising:

a signal detector for detecting signals on a telephone line;

a DTMF decoder for decoding DTMF signals;

a FSK decoder for decoding FSK signals; and a microprocessor which is driven when the signal detector detects a signal on the telephone line for only activating the DTMF decoder to calculate frequency spectrum of the detected signal, wherein, when the calculated frequency spectrum conforms to DTMF frequency spectrum, it is determined that a DTMF system is in use, and when the calculated frequency spectrum only has a frequency of about 1,200 Hz or 1,300 Hz, it is determined that a FSK system is in use, so as to deactivate the DTMF decoder and activate the FSK decoder.

2. The device for automatically identifying DTMF and FSK system as claimed in claim 1, wherein, when the microprocessor activates the DTMF decoder to calculate the frequency spectrum, it calculates an additional row frequency of about 1,300 Hz in addition to existed row and column frequencies of the DTMF system.

3. The device for automatically identifying DTMF and FSK system as claimed in claim 2, wherein the first one of the column frequencies of the DTMF system is modified to 1,200~1,209 Hz.

4. The device for automatically identifying DTMF and FSK system as claimed in claim 1, wherein each of the frequency of about 1,200 Hz and 1,300 Hz is present for about 47 ms.

5. The device for automatically identifying DTMF and FSK system as claimed in claim 1, further comprising a pre-amplifier and an analog to digital converter to convert the signals on the telephone line into digital data for being applied to the microprocessor.

6. The device for automatically identifying DTMF and FSK system as claimed in claim 5, further comprising a memory to store the digital data for being processed by the microprocessor.

7. The device for automatically identifying DTMF and FSK system as claimed in claim 1, wherein the DTMF decoder and the FSK decoder are implemented in software.

8. The device for automatically identifying DTMF and FSK system as claimed in claim 1, wherein the DTMF decoder and the FSK decoder are implemented in firmware.

9. The device for automatically identifying DTMF and FSK system as claimed in claim 1, wherein the DTMF decoder and the FSK decoder are implemented in hardware.

* * * * *